United States Patent
Yoon

(10) Patent No.: US 8,351,599 B2
(45) Date of Patent: Jan. 8, 2013

(54) CRYPTOGRAPHIC DEVICE FOR FAST SESSION SWITCHING

(75) Inventor: Jae Woo Yoon, Deajeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 859 days.

(21) Appl. No.: 12/136,130

(22) Filed: Jun. 10, 2008

(65) Prior Publication Data

US 2009/0147950 A1    Jun. 11, 2009

(30) Foreign Application Priority Data

Dec. 10, 2007    (KR) .................. 10-2007-0127621

(51) Int. Cl.
| | |
|---|---|
| H04K 1/00 | (2006.01) |
| H04K 1/04 | (2006.01) |
| H04K 1/06 | (2006.01) |
| H04L 9/00 | (2006.01) |
| H04L 9/28 | (2006.01) |
| G06F 11/30 | (2006.01) |
| G06F 12/14 | (2006.01) |

(52) U.S. Cl. ............... 380/28; 380/29; 380/37; 380/44; 713/189

(58) Field of Classification Search .............. 380/28, 380/29, 37, 44; 713/189
See application file for complete search history.

(56) References Cited

U.S. PATENT DOCUMENTS

| | | | | |
|---|---|---|---|---|
| 2004/0223610 | A1* | 11/2004 | Henry et al. | 380/37 |
| 2004/0250090 | A1* | 12/2004 | Crispin et al. | 713/189 |
| 2006/0023875 | A1* | 2/2006 | Graunke | 380/28 |
| 2009/0080647 | A1* | 3/2009 | Mantin et al. | 380/29 |

FOREIGN PATENT DOCUMENTS

| | | |
|---|---|---|
| KR | 1020030083100 | 10/2003 |
| KR | 100434558 B1 | 5/2004 |

* cited by examiner

Primary Examiner — Kambiz Zand
Assistant Examiner — Benjamin Kaplan
(74) Attorney, Agent, or Firm — Ladas & Parry LLP

(57) ABSTRACT

Provided is a cryptographic device for fast session switching, and more particularly, a cryptographic device using a block cipher algorithm and capable of rapidly performing session switching. The cryptographic device includes: a block cipher algorithm executer for performing encryption or decryption on input data using an initialization vector and a round key corresponding to a current session; an initialization vector manager for storing an initialization vector input from outside of the cryptographic device and an initialization vector received from the block cipher algorithm executer, and providing the initialization vector corresponding to the current session to the block cipher algorithm executer; and a session round key generator for storing a session key input from outside of the cryptographic device, generating the round key based on a session key corresponding to the current session, and providing the round key to the block cipher algorithm executer. The device has a structure capable of performing minimum operation to store and manage an initialization vector and a session key, and thus can minimize delay time caused by session switching.

16 Claims, 3 Drawing Sheets

CRYPTOGRAPHIC DEVICE FOR FAST SESSION SWITCHING

CROSS-REFERENCE TO RELATED APPLICATION

This application claims priority to and the benefit of Korean Patent Application No. 2007-127621, filed Dec. 10, 2007, the disclosure of which is incorporated herein by reference in its entirety.

BACKGROUND

1. Field of the Invention

The present invention relates to a cryptographic device for fast session switching, and more particularly, to a cryptographic device using a block cipher algorithm and capable of rapidly performing session switching.

2. Discussion of Related Art

When a session is switched while a block cipher algorithm is performed, an initialization vector value of the previous session must be stored in a safe memory area, and a cryptographic function must be reset using a session key, initialization vector, management mode, etc., of a new session. Here, the successive operations of storing information on a previous session and resetting a cryptographic function for a new session are referred to as session switch operations.

FIG. 1 is a block diagram of a conventional cryptographic device.

Referring to FIG. 1, conventional cryptographic devices are mostly for general purpose, in which encryption/decryption functions are implemented by a dedicated chip 140. In general, a Central Processing Unit (CPU) 110 takes charge of the session switch operations in the cryptographic device. However, a data bus size of a CPU is smaller than a block size and key size of a block cipher algorithm. Thus, the CPU 110 must access a memory 120 or an Input/Output (I/O) interface 130 several times for session switching. Consequently, the conventional cryptographic device has a problem in that delay time caused by the access operation of the CPU in a session switching process deteriorates overall speed and performance.

SUMMARY OF THE INVENTION

The present invention is directed to providing a cryptographic device capable of reducing delay time resulting from a session switching process in a multi-session environment to minimize performance deterioration caused by the delay time.

One aspect of the present invention provides a cryptographic device for fast session switching, comprising: a block cipher algorithm executer for performing encryption or decryption on input data using an initialization vector and a round key corresponding to a current session; an initialization vector manager, for storing an initialization vector input from outside of the cryptographic device and an initialization vector received from the block cipher algorithm executer, and providing the initialization vector corresponding to the current session to the block cipher algorithm executer; and a session round key generator for storing a session key input from outside of the cryptographic device, generating the round key based on a session key corresponding to the current session, and providing the round key to the block cipher algorithm executer.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
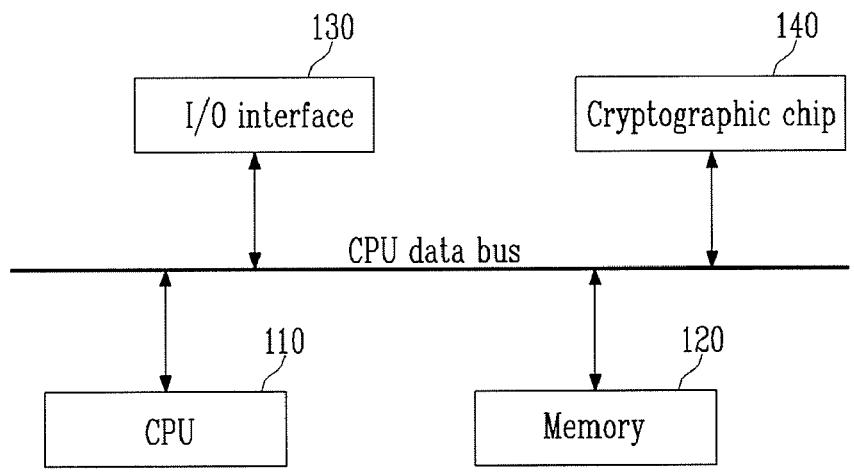
FIG. 1 is a block diagram of a conventional cryptographic device.
Figure 2:
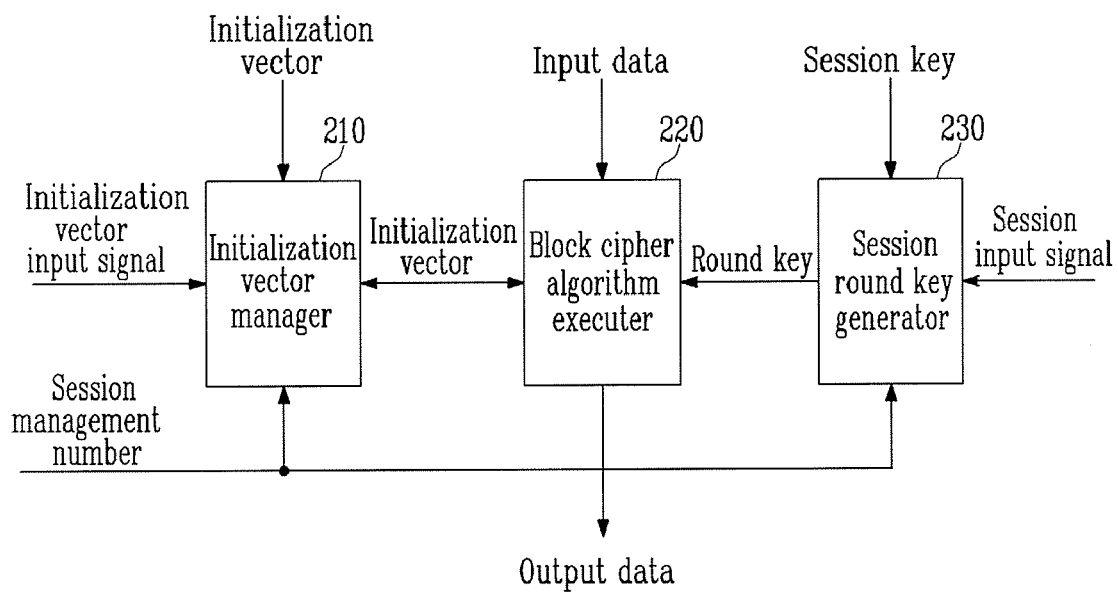
FIG. 2 is a block diagram of a cryptographic device for fast session switching according to an exemplary embodiment of the present invention.

FIG. 2 is a block diagram of a cryptographic device for fast session switching according to an exemplary embodiment of the present invention.

Referring to FIG. 2, the cryptographic device for fast session switching according to an exemplary embodiment of the present invention includes an initialization vector manager 210, a block cipher algorithm executer 220 and a session round key generator 230.

The initialization vector manager 210 receives an initialization vector from outside of the cryptographic device and stores it according to a session management number and an initialization vector input signal. According to the session management number, the initialization vector manager 210 provides the initialization vector to the block cipher algorithm executer 220 or receives a changed initialization vector from the block cipher algorithm executer 220 to update the corresponding initialization vector.

The session round key generator 230 receives a session key from outside of the cryptographic device and stores it according to the session management number and a session key input signal. Using the session key corresponding to the session management number, the session round key generator 230 generates a round key and provides it to the block cipher algorithm executer 220.

The block cipher algorithm executer 220 encrypts or decrypts input data using the initialization vector and the round key received from the initialization vector manager 210 and the session round key generator 230 and outputs the result. In addition, the block cipher algorithm executer 220 transfers an initialization vector changed while a block cipher algorithm is performed to the initialization vector manager 210 and thereby can update an initialization vector used in a current session.

Figure 3:
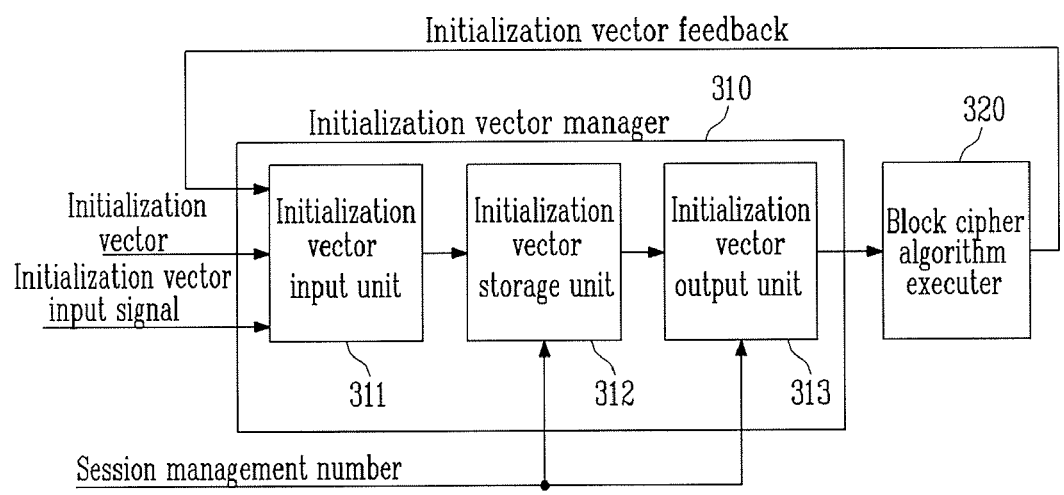
FIG. 3 is a block diagram of an initialization vector manager included in a cryptographic device for fast session switching according to an exemplary embodiment of the present invention.

FIG. 3 is a block diagram of an initialization vector manager included in a cryptographic device for fast session switching according to an exemplary embodiment of the present invention.

Referring to FIG. 3, an initialization vector manager 310 includes an initialization vector input unit 311, an initialization vector storage unit 312 and an initialization vector output unit 313.

The initialization vector input unit 311 selects one of an initialization vector input from outside of the cryptographic device and an initialization vector fed back from a block cipher algorithm executer 320 according to an initialization vector input signal, and transfers the selected initialization vector to the initialization vector storage unit 312.

The initialization vector storage unit 312 stores the initialization vector received from the initialization vector input unit 311 according to a session management number. In an exemplary embodiment, the initialization vector storage unit 312 may comprise at least one register or memory. Thus, the number of initialization vectors that can be provided by the initialization vector manager 310 without an external input may be determined by the capacity of the register and memory constituting the initialization vector storage unit 312.

The initialization vector output unit 313 selects an initialization vector corresponding to the corresponding session from initialization vectors stored in the initialization vector storage unit 312 according to session management numbers, and transfers the selected initialization vector to the block cipher algorithm executer 320.

Using this structure, the block cipher algorithm executer 320 feeds back an initialization vector changed while a cipher algorithm is performed, and the initialization vector manager 310 can store the fed-back initialization vector. Thus, it is unnecessary to store an initialization vector of a previous session in an additional memory when a session is switched in a multi-session environment, and an initialization vector already stored in the initialization vector storage unit 312 can be rapidly provided to the block cipher algorithm executer 320 when a session is switched back to a session before switching.

Figure 4:
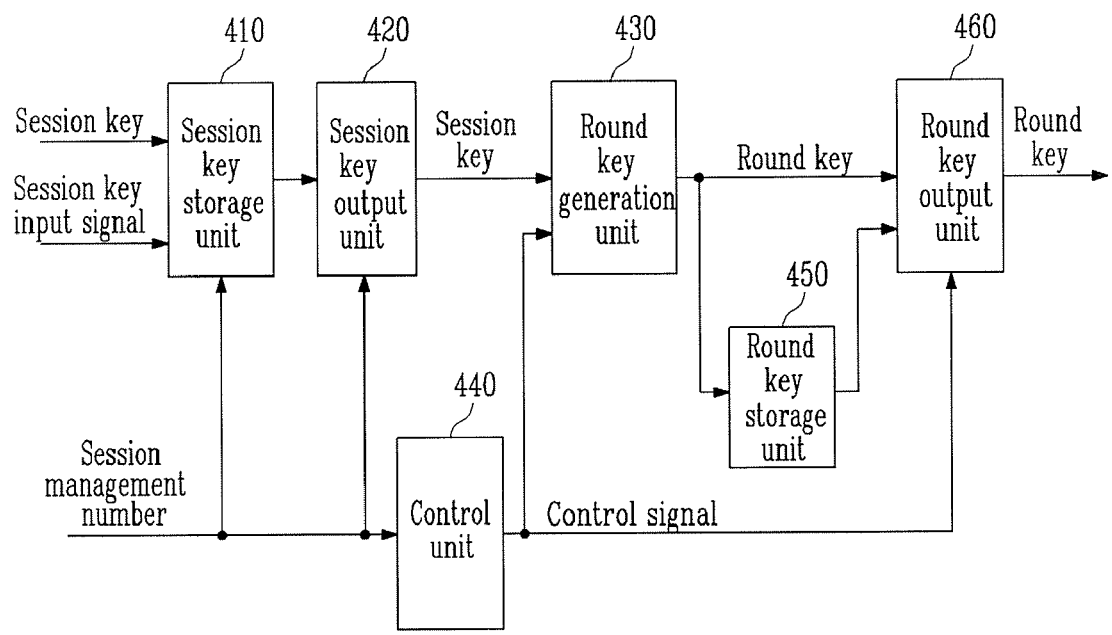
FIG. 4 is a block diagram of a session round key generator included in a cryptographic device for fast session switching according to an exemplary embodiment of the present invention.

FIG. 4 is a block diagram of a session round key generator included in a cryptographic device for fast session switching according to an exemplary embodiment of the present invention.

Referring to FIG. 4, the session round key generator includes a session key storage unit 410, a session key output unit 420, a round key generation unit 430, a control unit 440, a round key storage unit 450 and a round key output unit 460.

The session key storage unit 410 stores a session key input from outside of the cryptographic device according to a session key input signal and a session management number. In an exemplary embodiment, the session key storage unit 410 may comprise at least one register or memory.

The session key output unit 420 transfers a session key corresponding to the corresponding session among session keys stored in the session key storage unit 410 to the round key generation unit 430 according to the session management number.

The round key generation unit 430 generates a round key for performing a block cipher algorithm using the session key received from the session key output unit 420. Here, the round key is a value used in one round for performing the block cipher algorithm. A plurality of rounds are performed to process one block, and each of the rounds have one round key. For example, when one block is encrypted or decrypted through 16 rounds, and 200 blocks are processed during one session, 3200 (=16*200) round keys must be generated during the session.

According to the characteristics of a block cipher algorithm, a plurality of round keys used for encrypting or decrypting one block can be applied to another block in one session using the same session key. Therefore, round keys are generated during rounds only in which an initial block is encrypted or decrypted after a session is switched. The generated round keys are stored in a memory and used for other blocks in the same session. In this way, the session round key generator can minimize power required for generating round keys.

To implement this method, the control unit 440 determines whether or not a session is switched according to a session management number, generates a control signal according to the determination, and transfers the control signal to the round key generation unit 430 and the round key output unit 460. In an exemplary embodiment, the control unit 440 may additionally receive a start signal (not shown in the drawings) generated from a block cipher algorithm executer to determine when the block cipher algorithm is performed after a session is switched, and may generate a control signal using the session management number and the start signal.

The round key generation unit 430 generates a round key for a first block after a session is switched according to the control signal, and simultaneously transfers the round key to the round key output unit 460 and stores the round key in the round key storage unit 450.

The round key output unit 460 selects the round key generated from the round key generation unit 430 or the round key stored in the round key storage unit 450 according to the control signal generated from the control unit 440, and provides the selected round key to the block cipher algorithm executer. In an exemplary embodiment, the round key output unit 460 may output a generated round key while the round key generation unit 430 generates the round key, and output a round key stored in the round key storage unit 450 after the generation of a round key is finished. Therefore, the session round key generator can continuously supply round keys required for performing the block cipher algorithm to the block cipher algorithm executer while minimizing operation of the round key generation unit 430.

Figure 5:
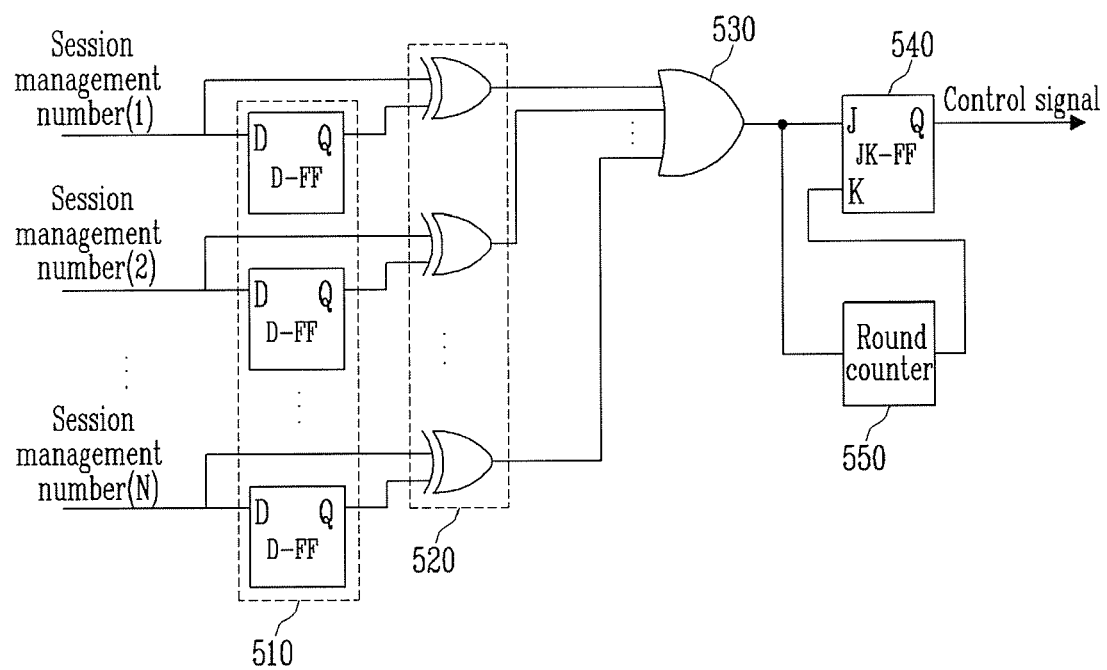
FIG. 5 is a block diagram of a control unit of FIG. 4 implemented in hardware according to an exemplary embodiment of the present invention.

FIG. 5 is a block diagram of a control unit of FIG. 4 implemented in hardware according to an exemplary embodiment of the present invention.

Referring to FIG. 5, respective bits of a session management number and outputs of D flip-flops 510 to which the respective bits of the session management number are input are input to respective Exclusive OR (XOR) gates 520. In addition, outputs of the XOR gates 520 are input to one OR gate 530.

An output of the OR gate 530 is input to a J input of a JK flip-flop 540 and a round counter 550, and an output of the round counter 550 is input to a K input of the JK flip-flop 540. The JK flip-flop 540 outputs a control signal according to the inputs. Here, the J and K inputs of the JK flip-flop 540 are initialized to be "0", and thus an initial output of the JK flip-flop 540 is "0". The round counter 550 serves to count clocks corresponding to the number of rounds required for encrypting or decrypting one block according to a block cipher algorithm used in the cryptographic device.

Operation of the control unit having the above-described constitution will be described below.

When as much as one bit of a session management number of a previous clock is different from that of a session management number of a current clock, that is, when a session has been switched, the changed bit is different from an output of the D flip-flop 510 storing a bit before the session is switched. Thus, the XOR gate 520 outputs "1", and the OR gate 530 outputs "1" for one clock when the session is switched. Here, the J input of the JK flip-flop 540 is "1", the K input is "0", and thus the JK flip-flop 540 outputs "1".

The output of the OR gate 530 is input to the round counter 550 to activate the round counter 550, and an output of the round counter 550 is kept at "0" for clocks corresponding to the number of rounds required for encrypting or decrypting one block following the output of the OR gate 530. Therefore, the output of the JK flip-flop 540 is kept at "1" for clocks corresponding to the number of rounds required for encrypting or decrypting a first block after the session is switched.

After the clocks corresponding to the number of rounds, the round counter 550 outputs "1" for one clock, and thus the JK flip-flop 540 outputs "0". From the next clock, the round counter 550 outputs "0" again to keep an output of the JK flip-flop 540 at "0".

Therefore, the control unit outputs a control signal of "1" during rounds in which a block cipher algorithm is performed on a first block after a session is switched, and outputs a control signal of "0" thereafter, thereby controlling operation of a round key generation unit and a round key output unit.

The present invention provides a structure of a cryptographic device performing minimum operation to store and manage an initialization vector and a session key, and can thereby minimize delay time caused by session switching.

In addition, the present invention generates a round key for a first block alone after session switching and thereby can reduce power consumption of a cryptographic device.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A cryptographic device for fast session switching, comprising:
   a processor;
   a block cipher algorithm executer configured to perform encryption or decryption on input data using an initialization vector and a round key corresponding to a current session;
   an initialization vector manager configured to store an initialization vector input from outside of the cryptographic device and an initialization vector received from the block cipher algorithm executer, and providing the initialization vector corresponding to the current session to the block cipher algorithm executer; and
   a session round key generator configured to store a session key input from outside of the cryptographic device, generate a plurality of round keys needed to perform encryption or decryption for a first block of the input data, based on a session key corresponding to the current session and provide the round keys to the block cipher algorithm executer during rounds only in which the block cipher algorithm executer performs encryption or decryption on the first block of the input data, wherein the session round key generator is further configured to store the generated round keys for the first block of the input data and provide them to the block cipher algorithm executer while encryption or decryption is performed on remaining blocks of the input data by the block cipher algorithm executer,
   wherein the initialization vector received from the block cipher algorithm executer is an initialization vector changed while the encryption or decryption is performed.

2. A cryptographic device for fast session switching, comprising:
   a processor;
   a block cipher algorithm executer configured to perform encryption or decryption on input data using an initialization vector and a round key corresponding to a current session;
   an initialization vector manager configured to store an initialization vector input from outside of the cryptographic device and an initialization vector received from the block cipher algorithm executer, and providing the initialization vector corresponding to the current session to the block cipher algorithm executer; and
   a session round key generator configured to store a session key input from outside of the cryptographic device, generate the round key based on a session key corresponding to the current session, and provide the round key to the block cipher algorithm executer,
   wherein the initialization vector received from the block cipher algorithm executer is an initialization vector changed while the encryption or decryption is performed,
   wherein the session round key generator comprises:
     a session key storage unit configured to store the session key received from outside of the cryptographic device according to a session key input signal and a session management number;
     a session key output unit configured to select a session key corresponding to the current session from the session key storage unit according to the session management number to output the selected session key;
     a round key generation unit configured to generate the round key using the session key output from the session key output unit,
     a control unit configured to generate a control signal according to the session management number;
     a round key storage unit configured to store the generated round key; and
     a round key output unit configured to select the round key generated from the round key generation unit or the round key stored in the round key storage unit according to the control signal to output the selected round key,
   wherein the round key generation unit generates the round key according to the control signal,
   wherein the control unit comprises:
     a plurality of D flip-flops receiving respective bits of the session management number;
     a plurality of Exclusive OR (XOR) gates receiving the respective bits of the session management number and outputs of the respective D flip-flops;
     an OR gate receiving outputs of the XOR gates;
     a round counter driven by an output of the OR gate; and
     a JK flip-flop receiving the output of the OR gate and an output of the round counter to output the control signal.

3. The cryptographic device of claim 2, wherein the initialization vector manager stores the initialization vector input from outside of the cryptographic device according to an initialization vector input signal, and provides the initialization vector corresponding to the current session to the block cipher algorithm executer according to a session management number.

4. The cryptographic device of claim 2, wherein the initialization vector manager comprises:
   an initialization vector input unit configured to receive the initialization vector input from outside of the cryptographic device or the initialization vector received from the block cipher algorithm executer according to an initialization vector input signal;
   an initialization vector storage unit configured to store the initialization vector received by the initialization vector input unit according to a session management number; and
   an initialization vector output unit configured to select an initialization vector corresponding to the current session from the initialization vector storage unit according to the session management number to output the selected initialization vector.

5. The cryptographic device of claim 4, wherein the initialization vector storage unit includes at least one register or memory.

6. The cryptographic device of claim 2, wherein the session round key generator stores the session key input from outside of the cryptographic device according to a session key input signal.

7. The cryptographic device of claim 2, wherein the session key storage unit includes at least one register or memory.

8. The cryptographic device of claim 2, wherein the round key generation unit generates the round key during a plurality of rounds configured to perform a block cipher algorithm on a first data block of the current session according to the control signal.

9. The cryptographic device of claim 8, wherein the round key output unit outputs the round key generated from the round key generation unit during the plurality of rounds and outputs the round key stored in the round key storage after the plurality of rounds.

10. The cryptographic device of claim 2, wherein the control unit determines whether or not a session is switched according to the session management number.

11. The cryptographic device of claim 2, wherein the block cipher algorithm executer generates a start signal indicating a start of performing a block cipher algorithm, and the control unit generates the control signal according to the session management number and the start signal.

12. The cryptographic device of claim 2, wherein the round counter counts clocks corresponding to a plurality of rounds configured to perform a block cipher algorithm on a first data block of the current session.

13. The cryptographic device of claim 12, wherein the JK flip-flop receives the output of the OR gate as a J input and the output of the round counter as a K input.

14. A cryptographic device for fast session switching, comprising:
   a processor;
   a block cipher algorithm executer configured to perform encryption or decryption on input data using an initialization vector and a round key corresponding to a current session;
   an initialization vector manager configured to store an initialization vector input from outside of the cryptographic device and an initialization vector received from the block cipher algorithm executer, and providing the initialization vector corresponding to the current session to the block cipher algorithm executer; and
   a session round key generator configured to store a session key input from outside of the cryptographic device, generate the round key based on a session key corresponding to the current session, and provide the round key to the block cipher algorithm executer,
   wherein the initialization vector received from the block cipher algorithm executer is an initialization vector changed while the encryption or decryption is performed,
   wherein the initialization vector manager is adapted to receive the changed initialization vector from the block cipher algorithm executer to update the corresponding initialization vector,
   wherein the round key is generated only during a round in which an initial block is encrypted or decrypted after a session has switched.

15. The cryptographic device of claim 14, wherein the session round key generator comprises:
   a session key storage unit configured to store the session key received from outside of the cryptographic device according to a session key input signal and a session management number;
   a session key output unit configured to select a session key corresponding to the current session from the session key storage unit according to the session management number to output the selected session key; and
   a round key generation unit configured to generate the round key using the session key output from the session key output unit.

16. The cryptographic device of claim 14, wherein the session round key generator further comprises:
   a control unit configured to generate a control signal according to the session management number;
   a round key storage unit configured to store the generated round key; and
   a round key output unit configured to select the round key generated from the round key generation unit or the round key stored in the round key storage unit according to the control signal to output the selected round key,
   wherein the round key generation unit generates the round key according to the control signal.

* * * * *